United States Patent
Ralls

[11] Patent Number: 5,919,335
[45] Date of Patent: Jul. 6, 1999

[54] FACER AND HAND HELD TOOL FOR JOINING SMALL DIAMETER PLASTIC PIPE

[75] Inventor: Gene R. Ralls, Tulsa, Okla.

[73] Assignee: TDW Delaware, Inc., Wilmington, Del.

[21] Appl. No.: 08/901,583

[22] Filed: Jul. 28, 1997

Related U.S. Application Data

[60] Provisional application No. 60/023,106, Aug. 1, 1996.

[51] Int. Cl.⁶ .................................................. B29C 65/00
[52] U.S. Cl. .......................... 156/503; 156/158; 156/159; 156/258; 156/304.2; 156/304.5; 156/507; 156/510; 156/579
[58] Field of Search ............................. 156/304.1, 304.2, 156/304.5, 304.6, 502, 503, 158, 159, 258, 507, 510, 516, 517, 530, 579

[56] References Cited

U.S. PATENT DOCUMENTS

| | | | |
|---|---|---|---|
| 3,013,925 | 12/1961 | Larsen | 156/153 |
| 3,359,151 | 12/1967 | Hall | 156/497 |
| 3,727,289 | 4/1973 | Bemelmann et al. | 29/237 |
| 3,729,360 | 4/1973 | McElroy | 156/499 |
| 3,793,119 | 2/1974 | Province | 156/499 |
| 3,976,534 | 8/1976 | Walter et al. | 156/507 |
| 4,174,996 | 11/1979 | Hunter | 156/499 |
| 4,352,708 | 10/1982 | McElroy | 156/378 |
| 4,484,495 | 11/1984 | McElroy | 156/503 |
| 4,714,513 | 12/1987 | McAlister | 156/359 |
| 4,927,999 | 5/1990 | Hanselka | 219/535 |
| 5,401,354 | 3/1995 | Colucci | 156/580 |
| 5,494,553 | 2/1996 | Colucci | 156/580 |
| 5,692,285 | 12/1997 | Weimer et al. | 29/401.1 |

Primary Examiner—James Sells
Attorney, Agent, or Firm—Head, Johnson & Kachigian

[57] ABSTRACT

A hand held tool for facing and joining the ends of opposed lengths of plastic pipe in axial alignment has a generally horizontal body and a generally vertical fixed handle extending from the body. A cylindrical shaft is supported by the body perpendicular to the fixed handle. A fixed pipe clamp is supported by the body by which a first length of plastic pipe can be removably secured. A moveable pipe clamp is slidably supported by the shaft by which a second length of plastic pipe may be secured. A moveable handle is pivotally supported to the body, the handle having a first portion in engagement with the second pipe clamp and a second portion extending in a plane of the fixed handle so that the second clamp can be manually moved towards the fixed clamp. A facer is removably positionable on the hand held tool between the fixed and moveable clamps, the facer having a cutter body having a cylindrical opening therethrough. A cutter holder is rotatably supported in the cylindrical opening. First and second annular rotor members are affixed to opposed sides of the cutter holder by which it can be manually rotated. Blades are secured to opposite sides of the cutter holder and are configured to cut and shape simultaneously opposed ends of lengths of plastic pipe.

20 Claims, 6 Drawing Sheets

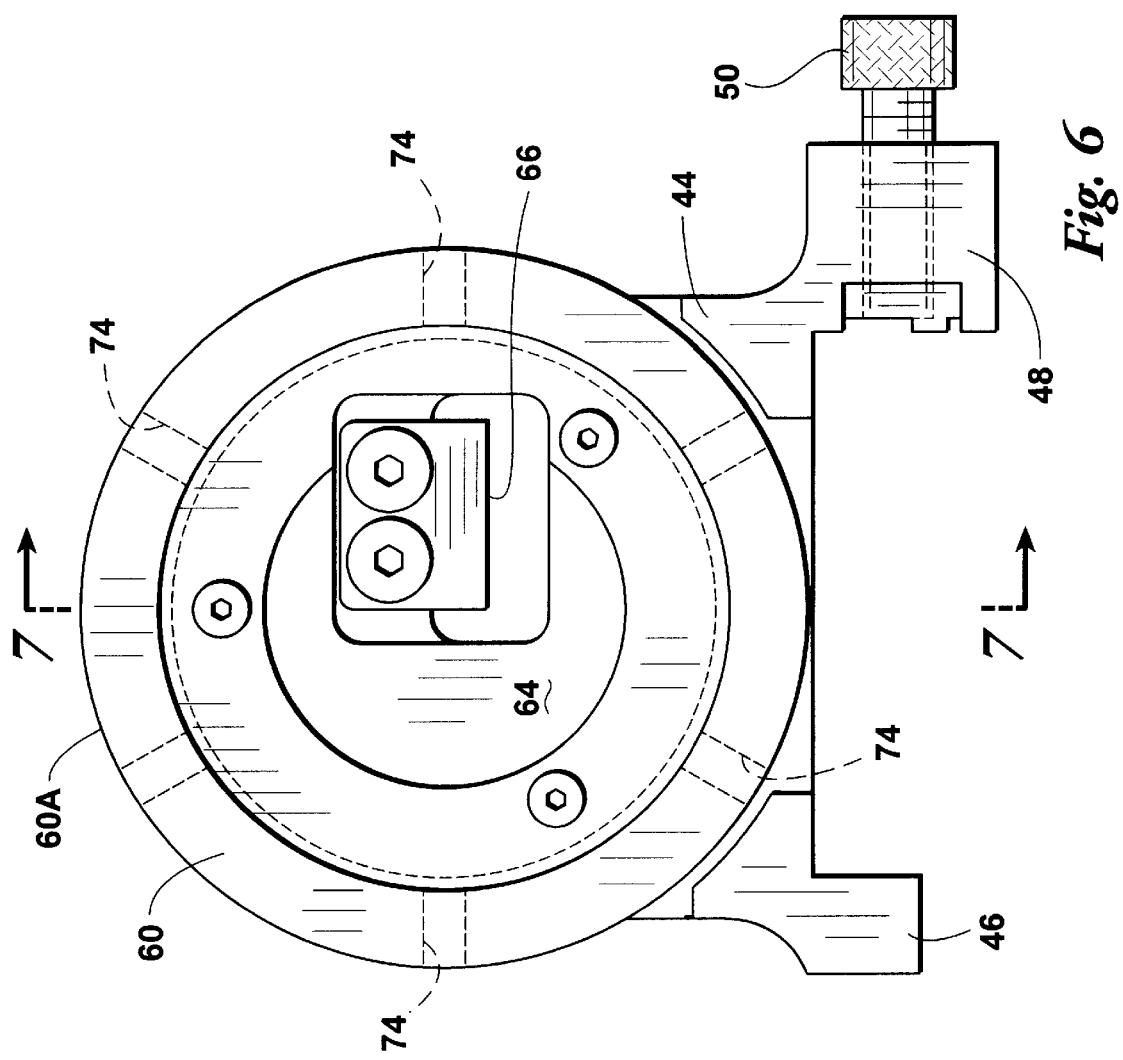
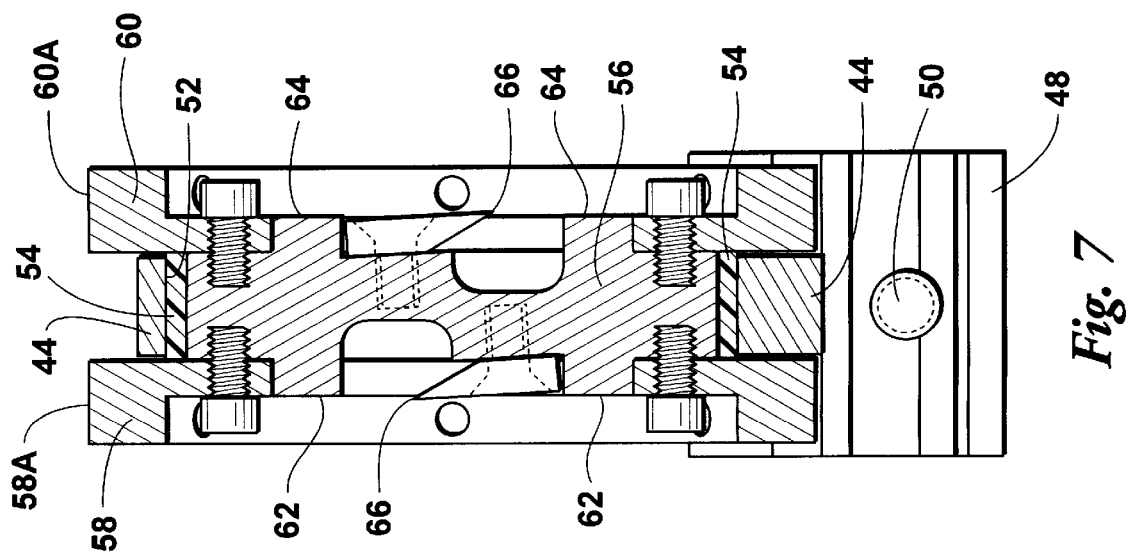
Fig. 6
Fig. 7

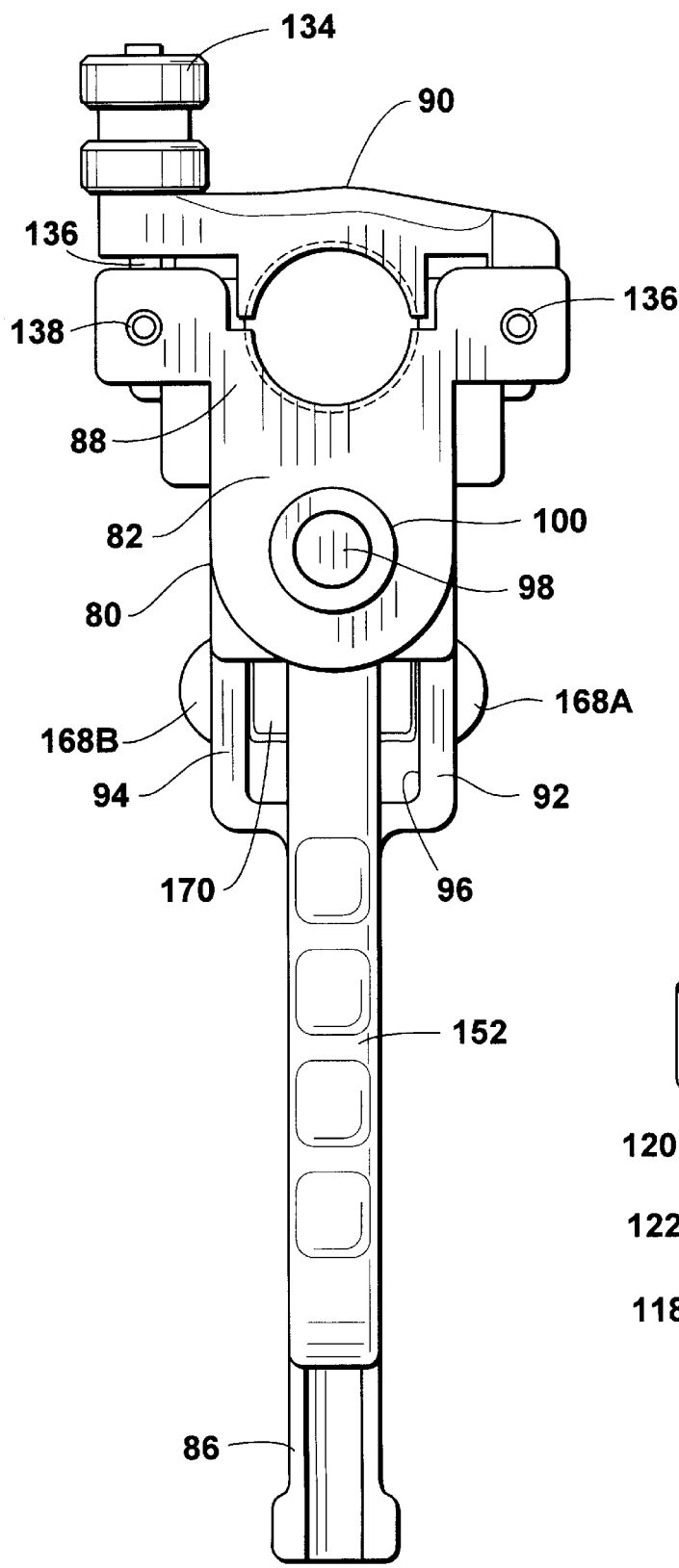
Fig. 9
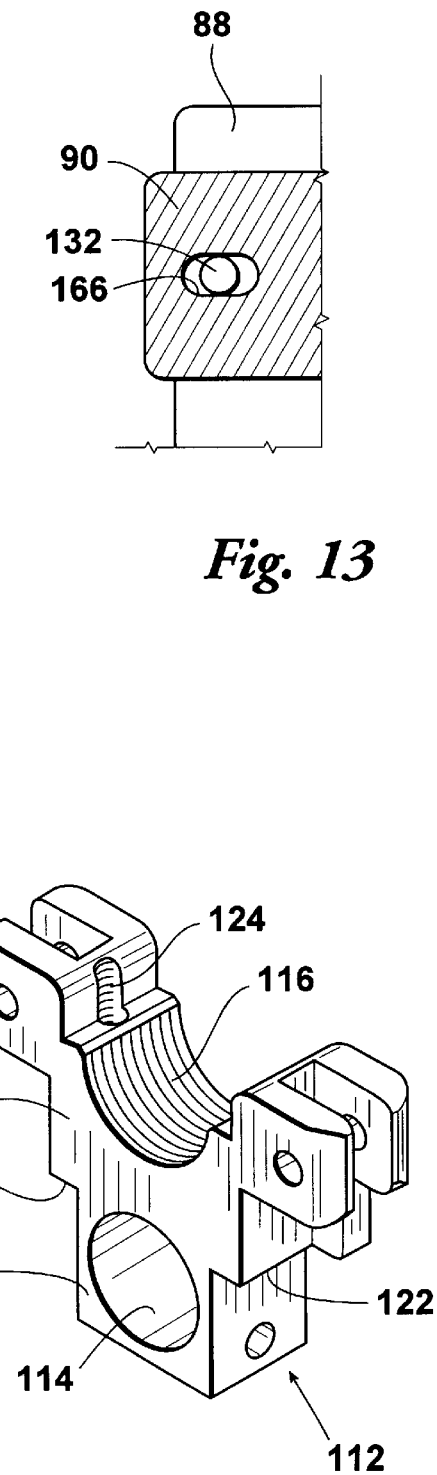
Fig. 13
Fig. 12

FACER AND HAND HELD TOOL FOR JOINING SMALL DIAMETER PLASTIC PIPE

REFERENCE TO PENDING APPLICATIONS

This application claims the benefit of and incorporates by reference prior filed Provisional application Ser. No. 60/023,106 filed Aug. 1, 1996 entitled "FACER FOR USE IN HAND HELD BUTT FUSION MACHINE FOR SMALL DIAMETER PLASTIC PIPE".

BACKGROUND OF THE INVENTION

Thermoplastic pipe is used extensively around the world for conducting liquids and gases. An advantage of thermoplastic pipe is that it can be thermally fused in end-to-end relationship so that pieces of plastic pipe can be joined to form conduits of any required length. Fusing plastic pipe in end-to-end axial relationship is referred to in the trade as "butt fusion".

Plastic pipe varies considerably in internal diameter, external diameter and wall thickness. Machines are readily available for butt fusing larger diameter pipe, that is, 2" in diameter and up. Some butt fusion machines include a hydraulic ram for moving clamped lengths of pipe towards and away from each other during a fusion process. The present invention however is concerned with butt fusion of smaller diameter plastic pipe, such as ½", ¾" and 1" as well an equivalent range of metric sizes including 20, 25, 30 and 34 millimeter pipe sizes, however, the tool can be used to butt fuse thermoplastic pipe of somewhat smaller or larger diameters.

In order to effectively butt fuse plastic pipe it is important that the ends of the plastic pipe to be fused are cleaned and shaped so that the ends of the lengths of pipe to be joined are each in a plane perpendicular to the pipe tubular axis. For this purpose, a piece of apparatus commonly employed in the trade is referred to as a "facer", that is, a device which functions to face the opposed ends of plastic pipe.

This invention is concerned with an improved hand held butt fusion device for fusing smaller diameter pipes and particularly with an improved facer for use with such equipment.

Further, the tool of this invention is a hand tool, that is, it is designed to be used by a workmen manually holding the tool during a fusion operation. Butt fusion machines for fusing larger diameter pipes are typically mounted on wheels to be moved about during the process of fusing lengths of thermoplastic pipes, such as when installing a pipeline, and such large and relatively expensive machines can be equipped to butt fuse smaller diameter pipe, however, the hand held tool to be described herein is much more economical, more convenient and quicker to use than when fusing smaller diameter pipe.

For background reference to patents that illustrate and describe ways of butt fusing lengths of plastic pipes, see the following United States patents:

| U.S. PAT. NO. | INVENTOR | TITLE |
| --- | --- | --- |
| 3,013,925 | Larsen | Method and Means For Welding Thermoplastic Pipes |
| 3,359,151 | Hall | Implement For Splicing Rope |
| 3,727,289 | Bemelmann et al | Device For Clamping and Moving Together Thermoplastic Pipes For Flush-Welding |
| 3,729,360 | McElroy | Portable Thermoplastic Pipe Fusion Apparatus |
| 3,793,119 | Province | Facing Tool For Plastic Pipe Fusion Apparatus |
| 3,976,534 | Walter et al | Device For Use In Uniting The Adjacent Ends of Radially Split Sealing Rings |
| 4,174,996 | Hunter | Pipe Jointing |
| 4,352,708 | McElroy | Defined Force Fusion Machine For Joining Plastic Pipe |
| 4,484,495 | McElroy | Hand Held Apparatus For Joining Small Diameter Plastic Pipe |

BRIEF SUMMARY OF THE INVENTION

A hand held tool and a facer for use therein are provided for joining in axial alignment opposed lengths of plastic pipe, commonly referred to in the trade as "butt fusion". Larger diameters of plastic pipe, such as 2" and above, are usually fused employing a stationary machine, commonly one that rests on the earth's surface adjacent to an area where plastic pipe is being installed in a gas or liquid distribution system. The present invention is, in contrast, concerned only with smaller diameter plastic pipe. By "small diameter" is meant pipe of about 1" in diameter and less although the principals of the invention could be employed in a tool for joining slightly larger diameters of pipe.

The tool described herein is "hand held". By this is meant that it is not designed to be supported on the earth's surface in any way but is intended to be employed by a workman holding the tool in his hand or hands while performing most of the steps to butt fuse lengths of plastic pipe.

The tool includes a generally horizontal body having opposed ends. A fixed handle extends generally vertical and downwardly from the body at a location intermediate the body opposed ends. The body and the fixed handle form a generally T-shaped configuration.

A cylindrical horizontal shaft is supported by the body that is generally perpendicular to the fixed handle.

A first pipe clamp is supported by the body, adjacent one end thereof, the pipe clamp extending upwardly away from the body in the direction opposite to the downwardly extending fixed handle. The fixed pipe clamp provides means for securing a first length of plastic pipe to the body.

A second pipe clamp is slidably supported by the shaft. A second length of plastic pipe can be secured in the second pipe clamp so that thereby two adjacent lengths of plastic pipe are supported by the clamps with their ends spaced adjacent to each other and in axial alignment with each other.

A pivotal handle is supported by the body. The pivotal handle has a first end portion that engages the second pipe clamp and a second end portion that extends in a plane of the fixed handle, the pivotal handle being attached by a hinge pin. The second end portion is pivotal towards and away from the fixed handle so that when the second end portion is pivoted towards the fixed handle the moveable clamp is moved towards the fixed clamp.

The T-shaped body, fixed handle, pivotal handle, fixed clamp and moveable clamp are arranged so that the weight of the tool is centered above the fixed handle to thereby make the tool easier and less tiring to use.

The body of the tool is adapted to removably receive a facer that can be positioned between adjacent ends of first and second lengths of plastic pipe. By pivoting the moveable handle the ends of the opposed lengths of plastic pipe can be moved to jointly contact opposite surfaces of the facer so that the ends to be joined can be simultaneously shaped to insure secure abutment with each other during the fusion process.

The facer has a cutter body having a cylindrical opening through it. A cylindrical cutter holder is rotatably supported in the body. Opposed first and second annular rotor members are affixed to opposed sides of the holder by which the holder may be manually rotated. Cutter blades are secured to opposite sides of the cutter body and are configured to cut and shape simultaneously the opposed ends of lengths of plastic pipe.

Within the tool body a spring is positioned on the cylindrical shaft between the fixed clamp and the moveable clamp so that the moveable clamp is biased in the direction away from the fixed clamp. The spring tension is overcome when an operator grasps the pivotal handle to move lengths of pipe towards each other.

In a preferred arrangement the tool body has spaced apart vertical portions providing a slot therebetween. The vertical portions each have a planar upper edge, the upper edges being in a common plane. The planar upper edges of the body vertical portions help position, orient and stabilize the moveable clamp with respect to the fixed clamp for more accurate support of plastic pipe during a fusion process. Further, such opposed planar surfaces provide a base on which a facer tool can be slidably positioned.

The tool includes a releasable lock in the form of a bolt that is positioned in a threaded opening in the body, the inner end of the bolt engaging the pivotal handle. The outer end of the bolt having a head for manual rotation thereof so that an operator can inwardly threadably advance the bolt to force the pivotal handle upper portion and thereby the moveable clamp towards the fixed clamp. In this way, when an operator has moved the ends of two lengths of pipe into contact during a butt fusion process, he or she can tighten the lock bolt to retain the lengths of pipe in contact with each other to allow molten end portions to cool. By being able to lock the moveable clamp with respect to the fixed clamp the operator can, if he or she chooses, lay the tool aside while the joint cools to enable the operator to do other things, or at least rest the grip that is otherwise required to maintain the lengths of pipe into forced contact with each other.

A better understanding of the invention will be obtained from the following detailed description of the preferred embodiment, taken in conjunction with the attached drawings.

DESCRIPTION OF THE DRAWINGS

FIG. 4 shows a handle member for use with the facer.

FIG. 6 is an elevational, enlarged view of the facer as shown in FIG. 4.

FIG. 7 is an elevational view, shown partially in cross-section, of the facer of FIG. 6.

FIG. 9 is an elevational end view of the tool as shown in FIG. 8.

FIG. 12 is an isometric view of the lower portion of a moveable clamp that is a part of the tool.

FIG. 13 is a fragmentary cross-sectional view of the upper portion of the fixed clamp part of the tool taken along the line 13—13 of FIG. 10.

DETAILED DESCRIPTION OF THE PREFERRED EMBODIMENT

Figure 1:
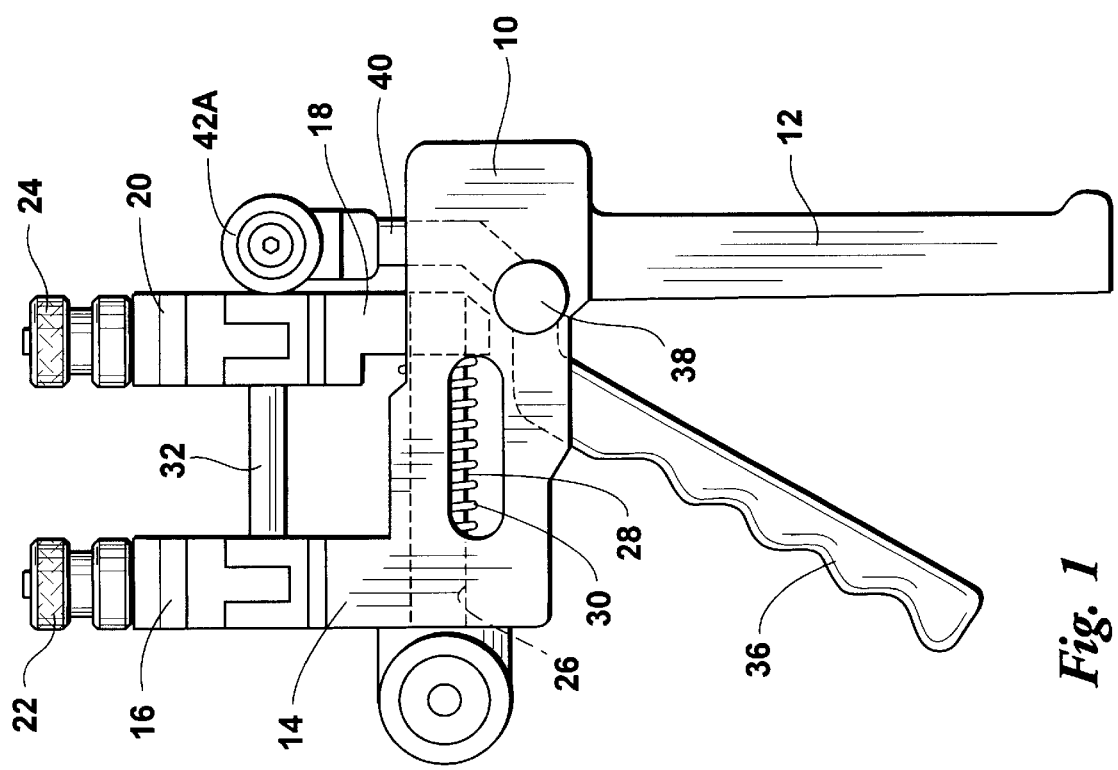
FIG. 1 is an elevational side view, shown partially broken away of a hand held butt fusion tool having the improvements of this invention.

Referring to the drawings and first to FIG. 1, a hand held butt fusion tool for small diameter plastic pipe is shown. The tool consists of a body 10 having an integral handle portion 12. Body 10 is elongated with respect to handle 12 and includes, at an outer end opposed to handle 12, an integral bottom portion 14 of a pipe clamp. Pivotally secured to pipe clamp bottom portion 14 is a pivoted upper portion 16 of the pipe clamp. The portions 14 and 16 together function to provide a fixed pipe clamp, that is, a clamp that is fixed with respect to body 10. The pipe clamp 14, 16 is adaptable to receive the end portion of the length of pipe to be butt fused to another length of pipe.

Slidably supported on body 10 is the bottom portion 18 of a moveable pipe clamp. Pivotally secured to bottom portion 18 is a pipe clamp upper portion 20. Elements 18 and 20 together form a moveable pipe clamp that is adaptable to receive the end portion of a second length of plastic pipe to be joined. Plastic pipes to be joined are not shown in the drawings.

Fixed pipe clamp pivoted portion 16 is releasably secured to integral bottom portion 14 by means of a knob 22 that has a threaded bolt portion. In like manner, a knob 24 releasably secures pipe clamp upper portion 20 to bottom portion 18. When knobs 22 and 24 rotate in one direction the pipe clamp upper portions 16 and 20 may be pivoted away from the clamp bottom portions to allow pipe portions to be inserted in the tool or a fused length of pipe to be removed from the tool.

Body 10 has an opening 26 that slidably receives a main shaft 28 extending from pipe clamp bottom portion 18. The sliding arrangement between main shaft 28 and opening 26 allows clamp 18, 20 to move with respect to fixed clamp 14, 16. A spring 30 received on main shaft 28 normally urges moveable clamp 18, 20 away from fixed clamp 14, 16.

To further stabilize moveable clamp 18, 20 with respect to body 10, a guide shaft 32 is secured to moveable pipe clamp body portion 18 and slides in an opening 34 in the fixed pipe clamp portion 14 of the tool body.

To advance moveable clamp 18, 20 with respect to fixed clamp 14, 16, a handle member 36 is employed, handle member 36 being pivoted about a pin 38. Handle member 36 has a Y-shaped upper portion 40 that is divided and receives opposed rollers 42A and 42B that engage a surface of moveable clamp body 18. When handle 36 is moved towards handle 12, moveable clamp 18, 20 is moved towards fixed clamp 14, 16.

In order to prepare the ends of pipe to be butt fused, a facer is used that is best illustrated in FIGS. 6 and 7. The facer has a body 44 having opposed integral legs 46 and 48 that, when the facer is in use on the butt fusion tool, extend to either side of the tool body 10. By means of a spaced apart thumb screw 50, (See FIGS. 4, 6 and 7), the facer body 44 is removably attached to tool body 10, the ends of the thumb screw sliding in a groove on the outer surface of the tool body.

As seen in FIG. 7, tool body 44 has a large diameter opening 52 therein that receives a bearing 54. Rotatably supported by bearing 54 is a cutter holder 56. Stated another way, cutter holder 56 has a circumferential exterior surface that receives bearing 54. Affixed to the opposed outer surfaces of cutter holder 56 are annular rotors 58 and 60. The external circumferential surface 58A and 60A respectively of the rotors extend slightly beyond the circumferential upper surface of facer body 44. Further, circumferential surfaces 58A and 60A of annular rotors 58 and 60 are knurled.

Figure 2:
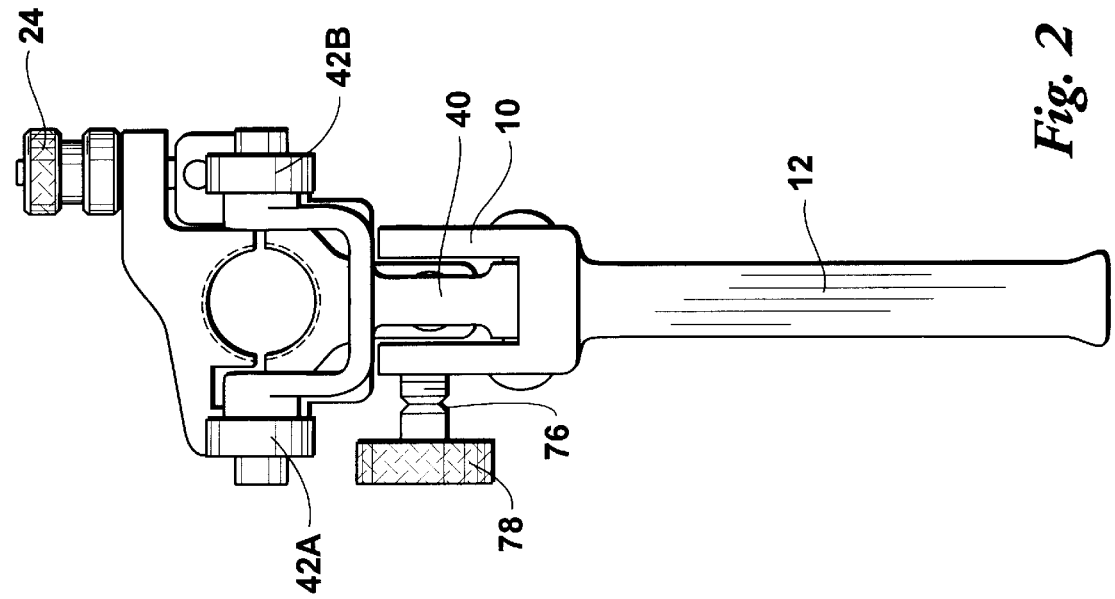
FIG. 2 is an elevational end view of the hand held butt fusion tool of FIG. 1.
Figures 3, 4, 5:
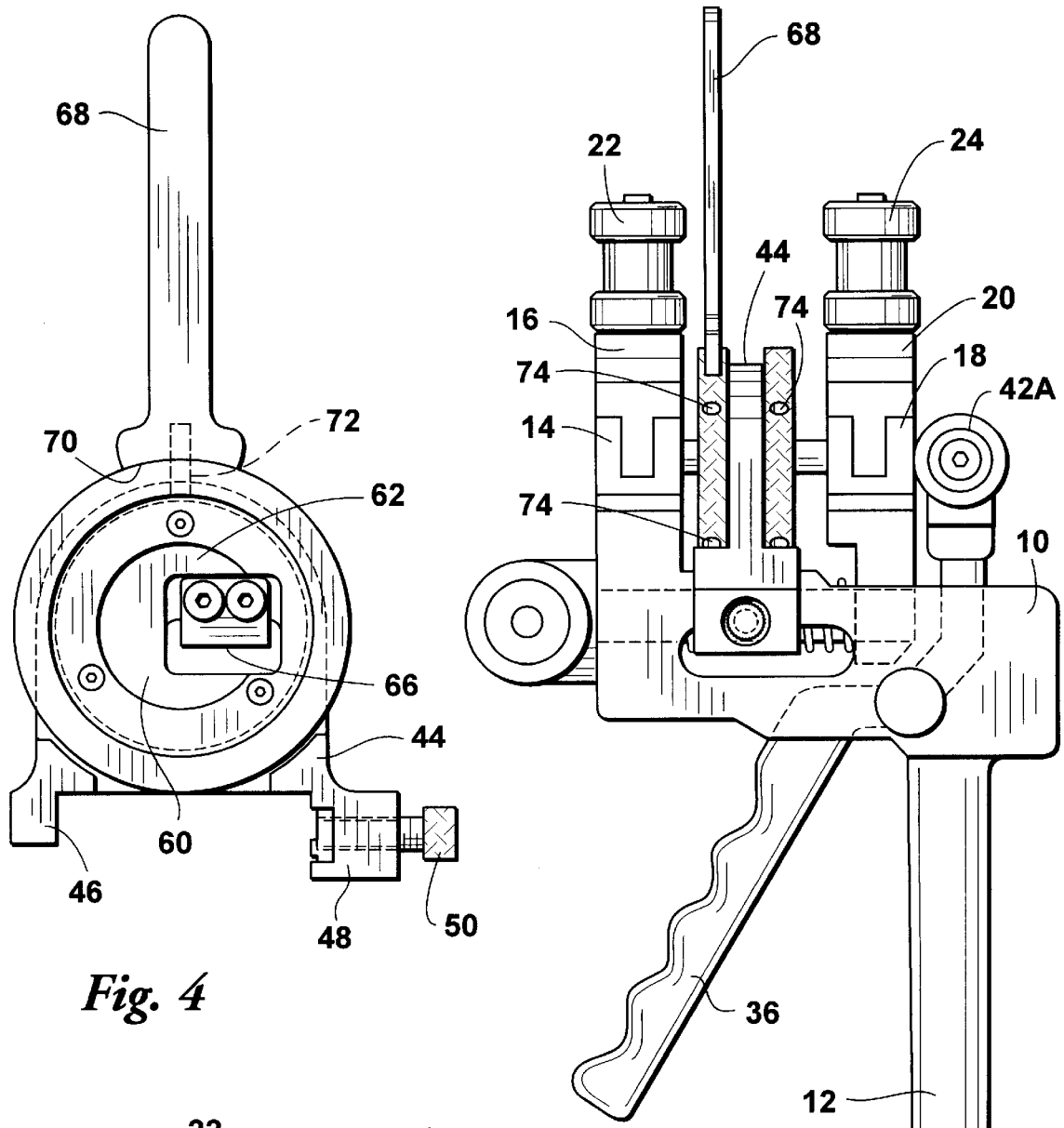
FIG. 3 is a top view of the tool of FIG. 1.
FIG. 4 is an elevational side view of a facer of this invention that is employed with a hand held butt fusion tool of the type illustrated in FIGS. 1 through 3.
FIG. 5 is an elevational view of a hand held butt fusion machine as shown in FIG. 1 with the facer and handle of FIG. 4 positioned within the tool by which the opposed ends of adjacent length of plastic pipe may be finished preparatory to butt fusing the ends together.

Cutter holder 56 is thus rotatably supported by facer body 44 and has opposed planar surfaces 62 and 64. Secured to these planar surfaces 62 and 64 are opposed cutter blades 66 as seen in FIGS. 4 and 6. The cutter blades are configured to engage abutted surfaces of opposed lengths of thermoplastic pipe held in the tool of FIGS. 1 through 3.

The facer of FIGS. 4, 6 and 7 is positioned in the butt fusion tool as shown in FIG. 5. Facer body 44 is slidable on tool body 10 so as to be self-centering between the ends of plastic pipe that are supported by fixed clamp 14, 16 and moveable clamp 18, 20. With facer 44 in position and with sections of pipe secured within clamps 14, 16 and 18, 20, and with an operator pulling handle 36 in the direction towards fixed handle 12, the ends of the opposed lengths of plastic pipe will be forced against the facer so that cutters 66 on opposite sides of the facer will contact the ends of the pipes. By manually engaging knurled surfaces 58A and 60A an operator can manually rotate cutter holder 56 and thereby cutter blades 66 to clean and shape the ends of the thermoplastic pipe.

As an assistance in rotating cutter holder 56, a cutter handle 68 may be employed. The cutter handle has an inner arcuate surface 70 that fits against one of the external circumferential cylindrical surface of annular rotor 58 or 60. Cutter handle 68 has a pin 72 extending from arcuate surface 70. Circumferential surfaces 58A and 60A of annular rotors 58 and 60 respectively have spaced apart radial openings 74 therein as seen in FIG. 5. To rotate the facer, pin 72 of cutter handle 68 is inserted into one of the openings 74 and the handle used to rotate cutter holder 56 about 90°. Thereafter pin 72 of handle 68 is inserted in a different opening 74. The sequence is repeated until cutter holder 56 has been rotated enough times to clean and shape opposed ends of plastic pipe held by the butt fusion tool.

An important advantage of the present invention is that facer 44 can be used to face the ends of plastic pipes of variable diameters. For instance, the same facer can be used to face pipes of ½", ¾" or 1" by example. This significant benefit is achieved by the employment of a cutter blade 66 that is long enough to engage all of these various diameters of pipe. This contrasts with hand held butt fusion tools of the past wherein a different facer is required for each size of pipe being fused.

Another advantage of the present invention is the use of a brake bolt 76 (see FIGS. 2 and 3) having a knob 78 affixed to the outer end thereof, the brake bolt extending threadably through an opening in tool body 10 to engage, at its inner end, main shaft 28. When lengths of pipe are being faced or heated to their fusion temperature, brake bolt 76 is loosened and does not engage shaft 28. However, after the ends of the pipe to be joined are raised to molten temperature and the ends are forced into contact with each other, while each are in a molten state by the operator moving handle 36 towards fixed handle 12, the operator can rotate knob 78 to force brake bolt 76 against main shaft 20 to lock the main shaft with respect to body 10 and to thereby lock the two lengths of pipe in fixed relationship to each other while the fused joint is in the process of cooling. This enables the operator, after the fused lengths of pipe have been forced into contact with each other, to use knob 78 to lock the pipes in position. The operator can then lay aside the tool and the lengths of pipe being fused to perform other tasks while the joint is cooling to the solidified state. After the joint has cooled to the solidified state, knob 78 is rotated to loosen brake bolt 76. Clamps 14, 16 and 18, 20 are opened by rotating knobs 22 and 24 to remove the joined lengths of pipe from the tool and to permit other lengths of pipe to be secured in the tool for a subsequent fusing operation.

FIGS. 1 through 5 illustrate a hand held butt fusion tool having advantages over such tools presently in use in the industry, however, an even more advanced and more preferred tool for butt fusing small diameter plastic pipe is illustrated in FIGS. 8 through 13 to which attention will now be directed.

The basic components of a preferred tool for joining lengths of small diameter plastic pipe are illustrated in FIGS. 8, 9, 10 and 11. The improved tool includes a generally horizontal body 80 having a front end 82 and a rearward end 84. Downwardly extending from body 80 intermediate ends 82 and 84 is a fixed handle 86. Body 80 and handle 86 are in a generally T-shaped configuration that has important advantages as will be pointed out subsequently. Body 80 and fixed handle 86 are illustrated as being integrally formed with each other, that is, as a single casting, however the invention is not so limited. Fixed handle 86 could be bolted, threaded to or otherwise attached to body 80.

Affixed to, or as illustrated, integrally formed with body 80 adjacent front end 82 is a fixed clamp lower portion 88. Pivotally attached to it is a fixed clamp pivotal portion 90.

Body 80 is, as illustrated, preferably formed to have integral spaced apart vertically oriented side portions 92 and 94 (See FIGS. 8 and 10) providing a vertical slot 96 therebetween. Positioned within slot 96 is a cylindrical shaft 98 that is in a vertical plane of and at least substantially perpendicular to fixed handle 86.

The front end 82 of body 80 has an increased thickness boss portion 100 having an opening 102 therein that receives shaft 98. In like manner, the rearward end 84 of body 80 has an integral increased thickness boss portion 104 having an opening 106 therethrough that receives shaft 98.

The increase thickness integral boss portions 100 and 104 provide for structural support for shaft 98 while otherwise keeping the ends of body 80 relatively thin to thereby reduce the total weight of the tool. Shaft 98 is maintained within openings 102 and 106 by set screws (not shown) that are threadably positioned in openings 108 and 110.

Figure 11:
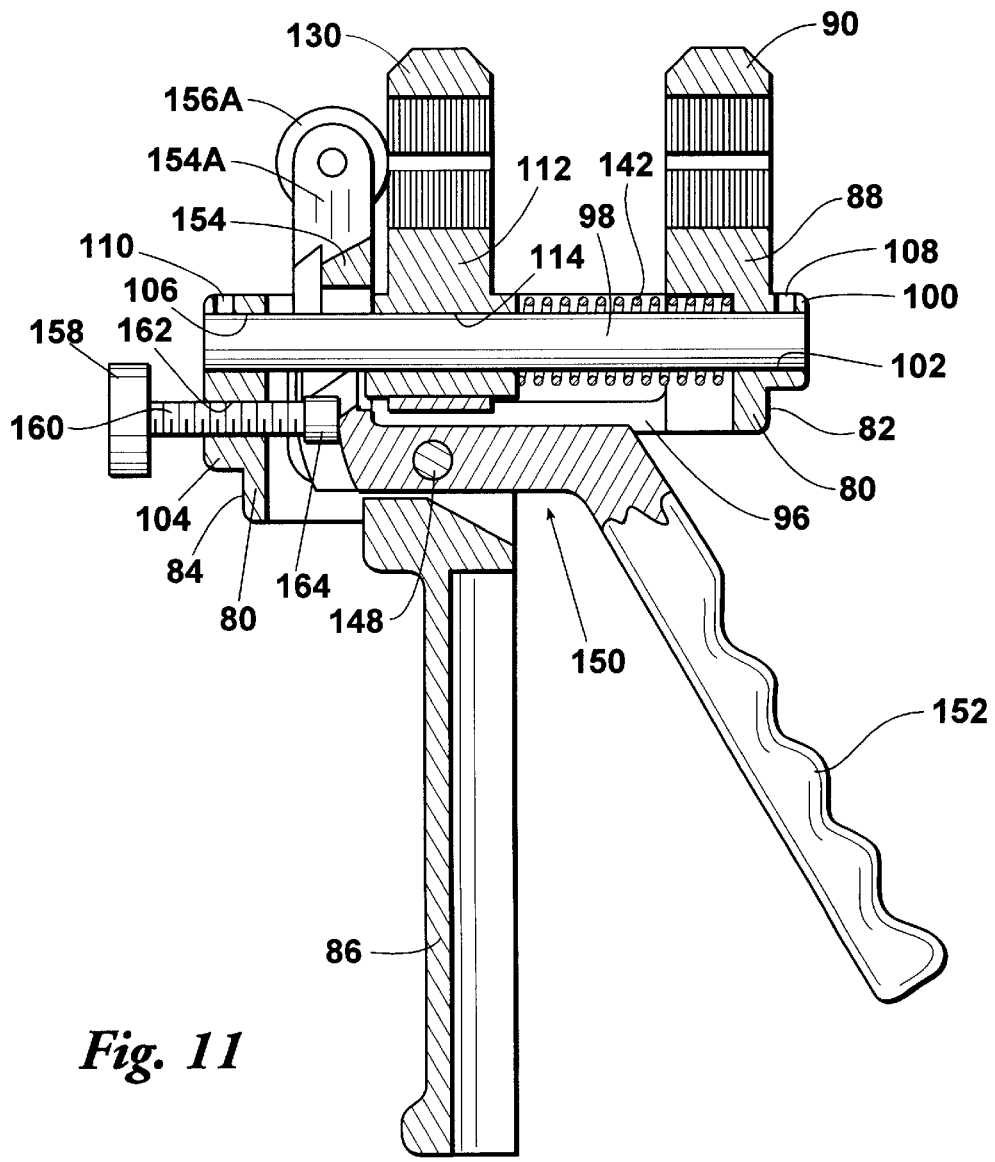
FIG. 11 is an elevational cross-sectional view as taken along the line 11—11 of FIG. 10.

Slidably received on shaft 98 and partially within slot 96 formed in body 80 is a moveable clamp lower portion 112 shown in cross-section in FIG. 11 and isometrically in FIG. 12. An opening 114 in clamp lower portion 112 slidably receives shaft 98 and the upper end of the moveable clamp has a semi-circular grooved recess 116 configured to engage a plastic pipe. The lower most portion of moveable clamp 112, that is, the portion having the narrowest width and indicated by the numeral 118 is dimensioned to slidably move within slot 96 formed in body 80. The upper part 120 of moveable clamp 112 is wider than lower part 118 providing horizontal ledges 122 that extend out over body side portions 92 and 94.

Figure 8:
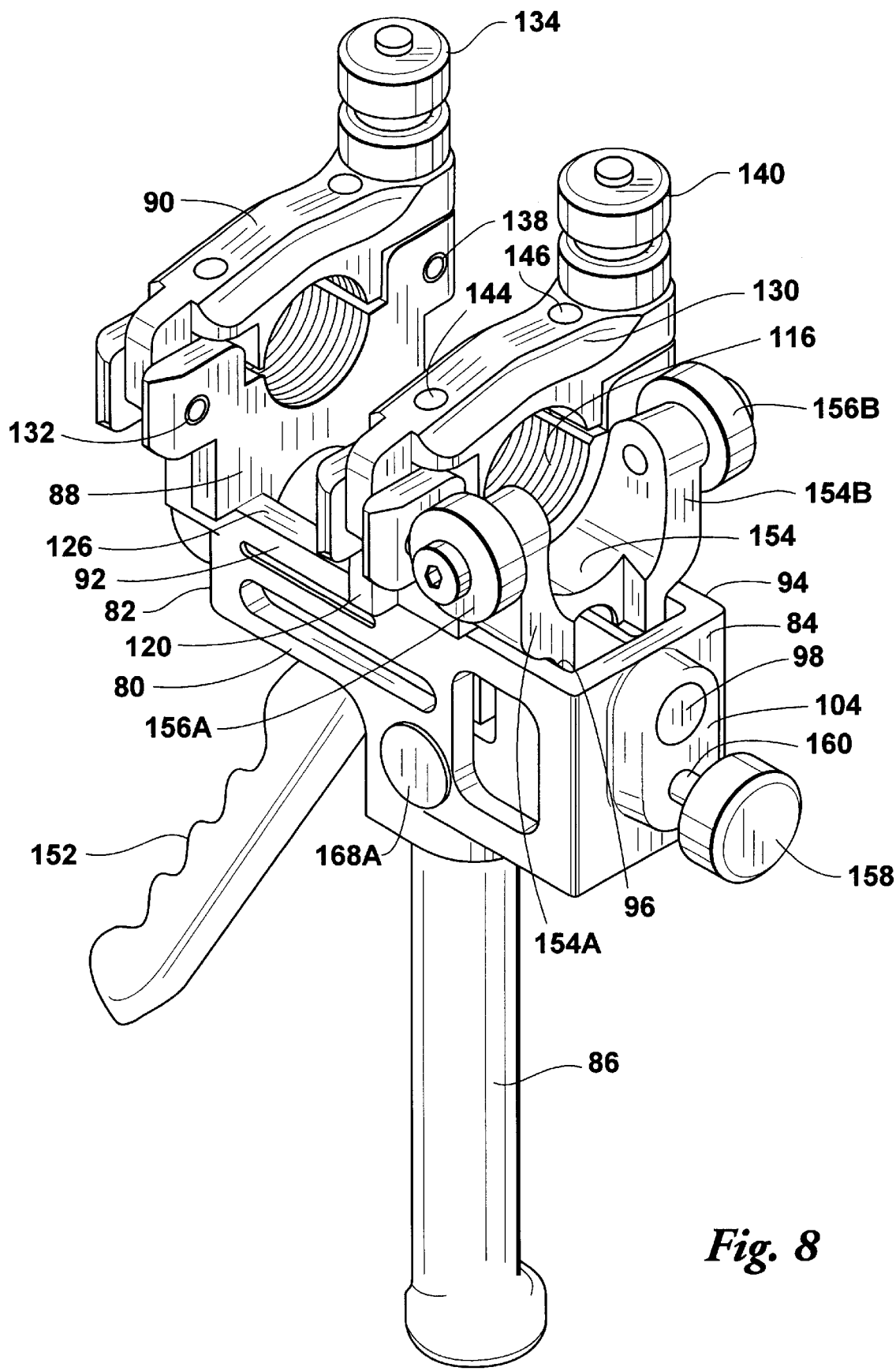
FIG. 8 is an elevational isometric view of a tool for joining small diameter plastic pipe that incorporates the principles of this invention.
Figure 10:
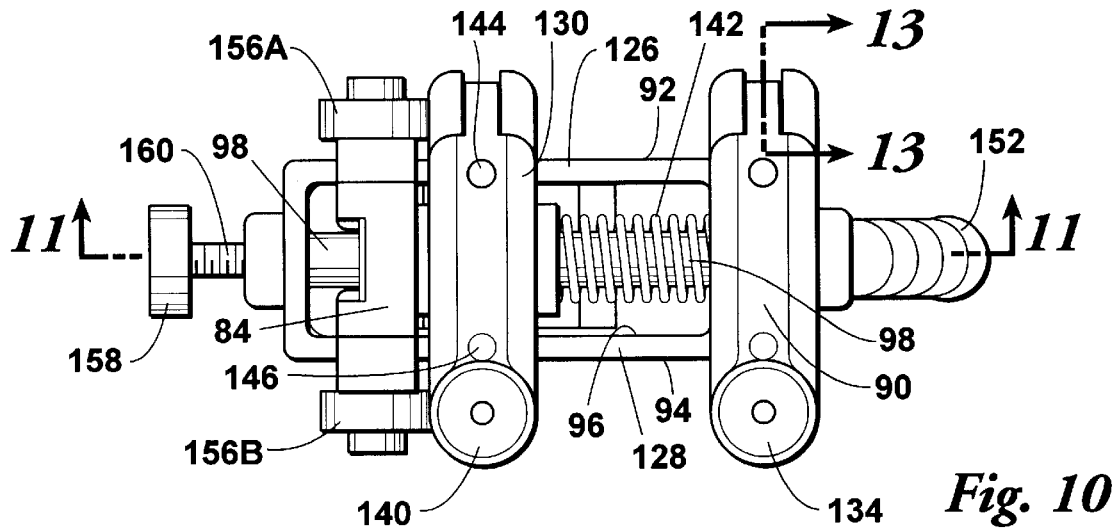
FIG. 10 is a top planar view of the tool of FIG. 8.

To either side of groove recess 116 spaced apart threaded openings 124 (only one of which is seen in FIG. 12) extend down through the moveable clamp wider upper part 120 and communicate with ledges 122. Threaded openings 124 each receive a set screw (not seen) that is preferably of the type that has a nylon tip. Body side portions 92 and 94, as best seen in FIGS. 8 and 10, have co-planar upper surfaces 126 and 128. The nylon tips of the set screws (not seen) that are received in threaded openings 124 slide on the planar upper surfaces 126 and 128 to provide a means of adjusting moveable clamp lower portion 112 with respect to body 80 and thereby with respect to fixed clamp lower portion 88. Thus, by this arrangement a system is provided for accurate micro adjustment of the moveable clamp with respect to the fixed clamp to insure accurate alignment of lengths of plastic pipe supported by the tool.

Pivotally supported to moveable clamp lower portion 112 is an upper portion 130. As seen in FIGS. 8 and 9, fixed clamp upper portion 90 is pivoted to fixed clamp lower portion 88 about a hinge pin 132. In like manner, moveable clamp upper portion 130 is pivoted to moveable clamp lower portion 112 by a hinge pin that is obscured in the drawings.

Fixed clamp upper portion 90 is releasably secured in an operating position with respect to fixed clamp lower portion 88 by means of a knob 134 threadably received on swing bolt 136 (See FIG. 9) that is pivotally attached to fixed clamp lower portion 88 by a hinge pin 138. In like manner, moveable clamp upper portion 130 is secured in the operating position by a knob 140 that is threadably attached to a swing bolt pivoted about a hinge pin, the swing bolt and hinge pin for the moveable clamp being obscured in the drawings.

When opposed lengths of plastic pipe are positioned in the tool, the clamp upper portions 90 and 130 are swung fully open and then the upper portions are moved into clamping positions around the plastic pipes by inserting the swing bolts in slots formed in the outer ends of the upper portions of the clamps after which knobs 134 and 140 are tightened.

As shown in FIGS. 10 and 11, received on shaft 98 is a coil spring 142 that extends between fixed clamp lower portion 88 and moveable clamp lower portion 112 to resiliently urge the moveable clamp away from the fixed clamp.

As seen in FIGS. 8 and 10, moveable clamp upper portion 130 has spaced apart openings 144 and 146 that are in alignment with threaded openings 124 formed in the moveable clamp lower portion 112 so that the end of a screwdriver or Allen wrench may be inserted through such openings to adjust set screws to accurately align the moveable clamp with respect to the fixed clamp even when the moveable clamp upper portion is closed. Similar openings (not numbered) are shown in fixed clamp upper portion 90 but have no function and are indicated only since fixed and moveable clamp upper portions 90 and 130 may be used interchangeably.

Pivotally supported to body 80 about a hinge pin 148 (See FIG. 11) is a moveable handle generally indicated by the numeral 150. The handle includes integrally formed lower end portion 152, that extends generally downwardly from hinge pin 148, and an upper end yolk portion 154. Pivotal handle lower portion 152 is bent or "dog legged" to extend forward of fixed handle 86 and in a vertical plane of the fixed handle and is shaped and configured so that a user can place one hand around both the fixed handle 86 and pivot handle lower portion 152 to move handle lower portion 152 in the direction of the fixed handle to move the moveable clamp towards the fixed clamp. The yolk upper portion 154 is split into two spaced apart extensions indicated by the numeral 154A and 154B (See FIG. 8) that are wider apart than the maximum diameter of the plastic pipe for which the tool is designed. At the upper ends of each of the yolk portions 154A and 154B are rollers 156A and 156B that, as seen in FIGS. 8 and 10, contact moveable clamp lower portion 112. Thus as moveable handle lower portion 152 is manually moved towards fixed handle 86, moveable clamp 112 is moved against the compression of spring 142 toward fixed clamp 88, thus moving ends of lengths of plastic pipe, when positioned within the tool, axially towards each other.

In the process of thermofusion of the opposed end surfaces of adjacent lengths of plastic pipe, the end surfaces are first faced, that is made planar with respect to each other as has been heretofore described, employing the facer tool illustrated in FIGS. 4 through 7. Thereafter the end surfaces of the opposed lengths of plastic pipe are heated to fusion temperature, and then moved, while the ends are in molten state, into physical contact with each other. When in contact the lengths of pipe must be held steady for a sufficient length of time to allow the molten end portions to cool to the plastic solid state as has been described. In order to relieve an operator from the chore of maintaining manual grip between the fixed and pivotal handles during the cooling process, the improved tool illustrated in FIGS. 8 through 13 includes a means of locking the moveable clamp with respect to the fixed clamp. This is accomplished as best seen in FIGS. 8, 10 and 11 by means of a locking knob 158 secured to the outer end of a threaded shaft 160 supported in a threaded opening 162 in body boss portion 104. The inner end of shaft 160 preferably includes a swivel 164 that engages moveable handle upper portion 154 when shaft 160 is threadably inwardly advanced.

The locking feature is used in this way: When facing and subsequently heating the ends of opposed lengths of plastic pipe shaft 160 remains in a substantially fully withdrawn position allowing complete freedom of movement of the moveable clamp to its fullest open position with respect to the fixed clamp. When an operator has heated the ends of pipes and moved them into contact with each other by manual pressure on handle lower portion 152 he can quickly rotate knob 158 to move swivel portion 164 into contact with the pivotal handle to thereafter retain the pivotal handle in its set position. This permits the operator to remove his grip from around the handles and, if fact, the operator can lay down the entire assembly while the fused ends of the plastic pipe cool below the temperature at which they become thermally fused. After the pipes have been fused, the operator rotates lock knob 158 in the opposite direction to retract shaft 160 to allow the fused pipes to be easily removed from the tool and additional lengths of pipe to be placed in the tool for fusion.

When the clamp upper portions 90 and 130 are secured to the clamp lower portions 88 and 112 it is important that the upper and lower portions accurately align with respect to the lower portions to precisely grasp lengths of plastic pipe to be supported by the clamps. FIG. 13 shows an innovative feature of the invention that assures aligned relationship between the upper and lower portions of both the fixed and moveable clamps. In FIG. 13, a small part of fixed clamp pivotal portion 90 is shown in cross-section as it is supported to fixed clamp lower portion 88. The hinge pin 132 that retains the clamp portions together is shown. An elongated opening 166 is formed in fixed clamp pivotal portion 90 that receives hinge pin 132. This allows the clamp upper portion 90 to move relative to the clamp lower portion to center the clamp upper portion around a length of plastic pipe so that, irrespective of minor irregularities in the plastic pipe, when the clamp upper portion is forced downwardly towards the clamp lower portion, the plastic pipe will be centrally grasped. While FIG. 13 illustrates the attachment of fixed clamp upper portion 90 to fixed clamp lower portion 88 the same arrangement is utilized to attach the moveable clamp upper and lower portions.

The tool for joining small diameter plastic pipe as has been herein described with reference to the drawings achieves advantages over other known tools intended to accomplish a similar purpose, including the tools illustrated in the issued United States patents listed in the background of the invention. An important aspect of the invention is the provision of a H-shaped body/fixed handle configuration that results in a balanced tool. That is, by using such H-shaped geometry the weight of the tool is centered equally to either side of a vertical plane of fixed handle 86. Compared to other tools that use an L-shaped body/fixed handle geometry in which the weight of the tool is off-center with respect to the fixed handle, the tool of this disclosure provides a balanced system for supporting lengths of small diameter plastic pipe for all steps of the fusion process.

This balanced T-shaped design is further improved by the locking mechanism that retains the moveable clamp in a fixed position with respect to the stationary clamp to shorten the time that an operator must apply manual grip between the fixed and moveable handles during the fusion process.

Another important feature of the invention that has been described is the unique body design that includes body side portions 92 and 94 with slot 96 therebetween, the slot serving to receive shaft 98 but also providing a carriage system for slidably receiving and positioning the moveable clamp as it moves towards and away from the fixed clamp. The provision of set screws that slide upon planar surfaces 126 and 128 of the body insures micrometer-like adjustment of the alignment of the moveable clamp with respect to the fixed clamp.

The use of rollers 156A and 156B to transfer force from pivotal handle 150 to moveable clamp 112 reduces the possibility that the force applied by the handle will cause misalignment of the moveable clamp with respect to the fixed clamp.

Although not specifically shown in the drawings, from an engineering standpoint it is desirable that a high quality bushing or linear type bearing be employed within opening 114 of the moveable clamp lower portion 112 to slide upon shaft 98. This bearing can be easily replaced by removing shaft 98 which can be taken from body 80 by loosening set screws in openings 108 and 110.

Hinge pin 148 that pivotally supports moveable handle 150 to the body is preferably in the form of a pin having push nuts 168A and 168B as seen in FIG. 9 that receives a flanged bushing 170 to securely and pivotally support pivotal handle 150 with respect to body side portions 92 and 94.

The invention has been described and illustrated in substantial detail to fully exemplify the preferred embodiment of the invention at the time of preparation of this disclosure. However, it is understood that the illustration and description of details are not intended to constitute limitations as to the practice of the invention since the actual embodiment of the invention that includes the principals described and illustrated herein may take on a completely different appearance.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A tool for joining the ends of opposed lengths of plastic pipe in axial alignment, comprising;

a generally horizontal body with opposed ends;

a generally vertical fixed handle extending from said body at a location intermediate of and spaced from said opposed ends, the body and fixed handle being thereby of generally T-shaped configuration;

a first pipe clamp supported by said body by which a first length of plastic pipe may be removable secured;

a second pipe clamp movable supported to said body by which a second length of plastic pipe may be secured; and a pivotal handle pivotally supported to said body having a first end in engagement with said second pipe clamp and a second end extending in a plane of said fixed handle for movement of said second clamp from a fully open position towards said first clamp, said second pipe clamp being in substantial vertical alignment with said fixed handle when in said fully open position, the tool being generally weight balanced with respect to said vertical fixed handle.

2. A tool for joining the ends of opposed lengths of plastic pipe according to claim 1 wherein said pivotal handle is supported to said body at a pivot point intermediate the pivotal handle first and second ends, a first portion of the pivotal handle between said first end and said pivot point being a hand engaging portion extending adjacent said fixed handle and a second portion of the pivotal handle extending contiguous to said second pipe clamp for moving said second pipe clamp as said pivotal handle is pivoted with respect to said fixed handle.

3. A tool for joining the ends of opposed lengths of plastic pipe according to claim 2 wherein said pivotal handle second portion is U-shaped and engages spaced apart portions of said second pipe clamp.

4. A tool for joining the ends of opposed lengths of plastic pipe according to claim 3 including rollers supported to said pivotal handle U-shaped second portion, the rollers engaging said spaced apart portions of said second pipe clamp.

5. A tool for joining the ends of opposed lengths of plastic pipe according to claim 1 including a releasable lock for locking said second clamp with respect to said first clamp.

6. A tool for joining the ends of opposed lengths of plastic pipe according to claim 5 including a threaded bolt received in a threaded opening in said body, an inner end of which is engageable with said second pipe clamp and an outer end of which has a knob thereon for manual rotation.

7. A tool for joining the ends of opposed lengths of plastic pipe according to claim 1 wherein said body has an upper surface defined by spaced apart ledges, having co-planar surfaces generally perpendicular to said fixed handle.

8. A tool for joining the ends of opposed lengths of plastic pipe according to claim 7 wherein said ledges are adaptable to receive a removable facer positionable between said first and second clamps.

9. A tool for joining the ends of opposed lengths of plastic pipe according to claim 7 wherein said second clamp has opposed portions that override said ledges and including a first and a second screw threadably mounted in threaded openings in said second clamp and in alignment with said ledges whereby inner ends of the screws slidably engage said ledges for alignment adjustment of said second clamp.

10. A tool for joining the ends of opposed lengths of plastic pipe according to claim 1 wherein each of said clamps is in the form of a lower portion having a semi-circular pipe receiving recess therein and an upper portion having a semi-circular pipe engaging recess therein, each clamp upper portion being pivotal with respect to its corresponding lower portion and slightly laterally displaceable relative thereto to be thereby self centering relative to its corresponding lower portion.

11. A tool for joining the ends of opposed lengths of plastic pipe comprising:

a generally horizontal body having spaced apart vertical portions providing a slot therebetween, and spaced apart linear surfaces at the top of the vertical portions, the body having opposed ends;

a generally vertical fixed handle extending from said body at a location intermediate said opposed ends;

a fixed pipe clamp supported by said body by which a first length of plastic pipe may be removably secured;

a moveable pipe clamp having a portion downwardly extending within said slot between said body vertical portions and having portions slidably contacting said spaced apart linear surfaces for accurately guiding said moveable pipe clamp towards and away from said fixed pipe clamp; and a pivotal handle having an upper portion extending upwardly between said body spaced apart vertical portions and a lower portion and an intermediate point of pivotation at which it is a pivotally attached to said body, the pivotal handle upper portion engaging said moveable pipe clamp, the pivotal handle lower portion extending in a vertical plane of and adjacent to said first fixed handle.

12. A tool for joining the ends of opposed lengths of plastic pipe according to claim 11 wherein said body and handle form a generally T-shaped arrangement, the tool being generally weight balanced with respect to said fixed handle.

13. A tool for joining the ends of opposed lengths of plastic pipe according to claim 11 including:

a cutter body configured at a lower end thereof for releasably and slidably engaging said spaced apart linear surfaces between said fixed and moveable pipe clamps, the cutter body having, at an upper end portion having a cylindrical opening therethrough;

a cutter holder having a circular exterior surface and rotatably supported in said opening in said cutter body;

opposed first and second annular rotor members affixed to opposed sides of said cutter holder by which said cutter holder may be manually rotated in said cutter body opening; and cutter blades secured to opposed faces of said cutter body and configured to cut and shape simultaneously the ends of opposed lengths of plastic pipe as the lengths of plastic pipe are moved against said cutter blades.

14. A tool for joining the ends of opposed lengths of plastic pipe according to claim 13 wherein said first and second annular rotor members each have textured exterior circumferential surfaces for augmenting manual rotation of said cutter body.

15. A tool for joining the ends of opposed lengths of plastic pipe according to claim 13 including an annular bearing received within said opening in said cutter body and surrounding said cutter holder circular exterior surface.

16. For use with a butt fusion tool for fusing lengths of thermoplastic pipe, the butt fusion tool having a body member supporting first and second opposed clamps for securing end portions of adjacent lengths of pipe, the butt fusion tool including means for moving the end portions of lengths of plastic pipe towards each other, a cutter tool for facing the ends of adjacent lengths of plastic pipe comprising:

a cutter body having means at a lower end thereof for releasably and slidably engaging the body portion of a butt fusion tool between first and second clamps, the cutter body having, at an upper end portion, a cylindrical opening therethrough;

a cutter holder having a circular exterior surface and rotatably supported in said opening in said cutter body;

opposed first and second annular rotor members affixed to opposed sides of said cutter holder by which said cutter holder may be manually rotated in said cutter body opening; and cutter blades secured to opposed faces of said cutter holder and configured to cut and shape simultaneously the opposed ends of lengths of plastic pipes as the plastic pipes are moved against said cutter blades.

17. A tool for facing the adjacent lengths of plastic pipe held in a butt fusion tool according to claim 16 wherein said first and second annular rotor members each have textured exterior circumferential surfaces for augmenting manual rotation of said cutter body.

18. A tool for facing the adjacent lengths of plastic pipe held in a butt fusion tool according to claim 16 including an annular bearing received within said opening in said cutter body and surrounding said cutter holder circular exterior surface.

19. A tool for facing the adjacent lengths of plastic pipe held in a butt fusion tool according to claim 16 wherein at least one of said rotor members has an external circumferential cylindrical surface having spaced apart inwardly radially extending recesses therein and including:

a cutter handle having a pin extending therefrom configured and dimensioned to removably extend within a said recess in a said rotor member, the cutter handle being thereby adaptable to aid in the rotation of a said rotor member and thereby said cutter holder.

20. A tool for facing the adjacent lengths of plastic pipe held in a butt fusion tool according to claim 19 wherein said cutter handle has an end thereof, an arcuate surface configured to engage and at least substantially conform to a said rotor member external circumferential cylindrical surface, said pin extending from said arcuate surface.

* * * * *